(12) United States Patent
Min et al.

(10) Patent No.: US 10,446,154 B2
(45) Date of Patent: Oct. 15, 2019

(54) COLLABORATIVE RECOGNITION APPARATUS AND METHOD

(71) Applicant: Samsung Electronics Co., Ltd., Suwon-si (KR)

(72) Inventors: Yun Hong Min, Seoul (KR); In Chul Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/209,835

(22) Filed: Jul. 14, 2016

(65) Prior Publication Data

US 2017/0069307 A1    Mar. 9, 2017

(30) Foreign Application Priority Data

Sep. 9, 2015    (KR) .......................... 10-2015-0127914

(51) Int. Cl.
| | | |
|---|---|---|
| *G10L 17/22* | (2013.01) | |
| *G10L 15/00* | (2013.01) | |
| *G10L 15/25* | (2013.01) | |
| *G10L 15/32* | (2013.01) | |
| *G06K 9/00* | (2006.01) | |

(52) U.S. Cl.
CPC .......... *G10L 15/32* (2013.01); *G06K 9/00979* (2013.01)

(58) Field of Classification Search
CPC .......... G10L 17/22; G10L 15/25; G10L 15/00
USPC ...................... 704/231, 233, 251; 701/539
See application file for complete search history.

(56) References Cited

U.S. PATENT DOCUMENTS

| | | | | |
|---|---|---|---|---|
| 6,671,403 | B1 * | 12/2003 | Takasu ................. | G06K 9/6292 382/187 |
| 9,129,148 | B1 * | 9/2015 | Li ....................... | G06K 9/00268 |
| 9,318,111 | B2 * | 4/2016 | Lee ........................ | G10L 15/22 |
| 2002/0143532 | A1 | 10/2002 | McLean et al. | |
| 2003/0200089 | A1 * | 10/2003 | Nakagawa .............. | G10L 13/00 704/251 |
| 2005/0182628 | A1 * | 8/2005 | Choi ....................... | G10L 15/08 704/252 |
| 2006/0235684 | A1 * | 10/2006 | Chang ..................... | G10L 15/30 704/233 |
| 2010/0004930 | A1 * | 1/2010 | Strope .................... | G10L 15/32 704/240 |
| 2010/0204987 | A1 * | 8/2010 | Miyauchi ................ | G10L 15/25 704/233 |

(Continued)

FOREIGN PATENT DOCUMENTS

| | | |
|---|---|---|
| JP | 2005-309671 A | 11/2005 |
| JP | 2014-71446 A | 4/2014 |

(Continued)

*Primary Examiner* — Seong-Ah A Shin
(74) *Attorney, Agent, or Firm* — NSIP Law

(57) ABSTRACT

A collaborative recognition apparatus, the recognition apparatus includes a recognition data generator configured to generate recognition data based on sensor data, a processor configured to calculate reliability of the recognition data and to determine whether collaboration is desired based on the calculated reliability, and request collaboration data from the external recognition apparatus, and correct the recognition data based on the collaboration data received from the external recognition apparatus to generate final recognition data, in response to a determination that the collaboration is desired.

20 Claims, 8 Drawing Sheets

(56) References Cited

U.S. PATENT DOCUMENTS

| | | | |
|---|---|---|---|
| 2010/0312546 A1* | 12/2010 | Chang | G10L 15/32 704/9 |
| 2012/0179463 A1* | 7/2012 | Newman | G10L 15/30 704/231 |
| 2012/0296644 A1* | 11/2012 | Koll | G10L 15/32 704/231 |
| 2013/0229508 A1 | 9/2013 | Li et al. | |
| 2014/0028826 A1* | 1/2014 | Lee | G10L 15/25 348/77 |
| 2014/0316776 A1* | 10/2014 | Lee | G10L 15/22 704/231 |
| 2014/0343935 A1* | 11/2014 | Jung | G10L 15/20 704/233 |
| 2015/0081300 A1* | 3/2015 | Kim | G10L 15/07 704/246 |
| 2015/0221308 A1* | 8/2015 | Suzuki | G01C 21/3608 701/539 |
| 2015/0304252 A1* | 10/2015 | Ogata | H04W 4/21 715/733 |
| 2016/0155436 A1* | 6/2016 | Choi | G10L 15/183 704/232 |
| 2017/0053652 A1* | 2/2017 | Choi | G10L 15/32 |

FOREIGN PATENT DOCUMENTS

| | | |
|---|---|---|
| KR | 1995-0004050 A | 2/1995 |
| KR | 2001-0075838 A | 8/2001 |
| KR | 10-2008-0066129 A | 7/2008 |
| KR | 10-2011-0109345 A | 10/2011 |
| KR | 10-1089287 B1 | 12/2011 |
| KR | 10-2013-0065041 A | 6/2013 |
| KR | 10-2013-0073709 A | 7/2013 |
| KR | 10-1333076 B1 | 11/2013 |
| KR | 10-2014-0014812 A | 2/2014 |
| KR | 10-1396888 B1 | 5/2014 |
| KR | 10-2014-0135349 A | 11/2014 |
| KR | 10-2015-0042674 A | 4/2015 |

* cited by examiner

COLLABORATIVE RECOGNITION APPARATUS AND METHOD

CROSS-REFERENCE TO RELATED APPLICATION(S)

This application claims benefit under 35 USC § 119(a) of Korean Patent Application No. 10-2015-0127914, filed on Sep. 9, 2015, in the Korean Intellectual Property Office, the entire disclosure of which is incorporated herein by reference for all purposes.

BACKGROUND

1. Field

The following description relates to a recognition apparatus and method with collaborative recognition.

2. Description of Related Art

In a general speech recognition or image recognition technology, recognition results are output by using one type of recognition apparatus or by combining results from various types of recognition apparatuses for an identical input. However, performance of recognition apparatuses may be reduced by input data variation occurring due to a relative distance between a microphone and a speaker in the case of speech recognition, and due to a relative distance between a camera and an object in the case of image recognition.

Accordingly, in order to overcome such drawback, methods of training recognition apparatuses by considering various inputs have been suggested. However, such methods, which cannot consider all types of input variations accordingly may not solve the problem.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a collaborative recognition apparatus, the recognition apparatus includes a recognition data generator configured to generate recognition data based on sensor data, a processor configured to calculate reliability of the recognition data and to determine whether collaboration is desired based on the calculated reliability, and request collaboration data from the external recognition apparatus, and correct the recognition data based on the collaboration data received from the external recognition apparatus to generate final recognition data, in response to the determination that the collaboration is desired.

The processor may include a collaboration determiner configured to calculate the reliability of the recognition data and to determine whether collaboration may be desired based on the calculated reliability, and a collaborator, wherein in response to the determination that the collaboration may be desired, the collaborator may be configured to request collaboration data from the external recognition apparatus, and correct the recognition data based on the collaboration data received from the external recognition apparatus to generate the final recognition data.

The recognition data generator may be configured to receive the sensor data from a sensor mounted in the recognition apparatus and from at least one or more sensors among external sensors connected to the recognition apparatus, and based on the received sensor data, the recognition data generator may be configured to generate the recognition data that may include at least one of keywords, texts, and figures according to a recognition target or a recognition purpose of the recognition apparatus. The sensors may include at least one of an image sensor, a voice sensor, a location sensor, a gyro sensor, a temperature sensor, a pressure sensor, and an accelerometer.

The collaboration determiner may be configured to calculate the reliability of the recognition data by using at least one of a similarity model generated based on a similarity between training data and recognition data that are used to generate the recognition data, and an environment model generated based on at least one of an ambient noise around the sensors and a location relationship between a recognition target and the sensors.

The collaborator may include a collaboration data requester, wherein in response to the determination that collaboration may be desired, the collaboration data requester may be configured to scan one or more external recognition apparatuses located within a specific range based on location information included in the sensor data, and requests the collaboration data from the one or more scanned external recognition apparatuses. The collaboration data requester may be configured to receive purpose identification information that may include one or more of apparatus information, location information, communication method information, and data format information of the one or more external apparatuses; compare the received purpose identification information with purpose identification information of the recognition apparatus to scan an external recognition apparatus that serves an identical purpose; and request the collaboration data from the external recognition apparatus.

The collaborator may include an identical recognition target determiner, wherein in response to receiving the collaboration data from the external recognition apparatus, the identical recognition target determiner may be configured to determine collaboration data relating to an identical recognition target, among the received collaboration data, based on one or more of a location of the external recognition apparatuses, a receiving time, a type, and a size of the received collaboration data, and a keyword extracted from the received collaboration data, and the identical recognition target determiner may be configured to correct the recognition data by using the determined collaboration data.

The collaborator may include a final recognition data generator configured to generate final recognition data by selecting data having the highest reliability from among data that may include the recognition data and the collaboration data, or by selecting data having the highest value from among the data based on at least one of a number of identical data, a percentage of identical data, and a weighted sum of reliabilities that may be obtained by applying a weighted value to the reliabilities.

In another general aspect, a collaboration recognition includes a recognition data collector configured to collect recognition data from a plurality of external recognition apparatuses, a collaboration data generator, wherein in response to the recognition data being collected from the plurality of recognition apparatuses, the collaboration data generator is configured to classify the collected recognition data according to predetermined criteria and generate collaboration data, and a collaboration data provider, wherein in response to receiving a request for the collaboration data from any one of the recognition apparatuses, the collaboration data provider is configured to determine which select collaboration data of the collaboration data to be provided in response to the request, and transmit the select collaboration data to the one recognition apparatus.

The apparatus may further include a recognition data generator configured to generate recognition data from a sensor of the apparatus. The recognition data collector may be further configured to collect the recognition data from the plurality of recognition apparatuses and the recognition data generator.

The recognition data collector may be further configured to classify the recognition data collected from the recognition apparatuses according to at least one of a recognition purpose and a recognition target, and store the classified recognition data in a recognition data database.

The predetermined criteria may include at least one of a purpose, a location, a recognition time, a recognition detail, and a recognition target of the recognition apparatuses. The collaboration data generator may be further configured to generate the collaboration data by selecting data having the highest reliability, from among the collected recognition data, or by determining the select recognition data having the highest value, from among the collected recognition data, based on at least one of a number of identical recognition data, a percentage of identical recognition data, and a weighted sum of reliabilities that may be obtained by applying a weighted value to the reliabilities.

In response to receiving a request for the collaboration data from any one of the recognition apparatuses, the collaboration data provider may be further configured to determine whether collaboration may be desired based on reliability of the generated collaboration data, and in response to a determination that the select collaboration may be desired, the collaboration data provider may be further configured to determine collaboration data to be provided to the one recognition apparatus.

In response to the recognition data being collected, the collaboration data generator may be further configured to calculate reliability of the collected recognition data, and generates the collaboration data based on the calculated reliability.

The request may include at least one of locations of the recognition apparatuses, and any of types, sizes, and acceptable reliabilities of the recognition data.

In another general aspect, a collaborative recognition method includes generating recognition data based on sensor data, calculating reliability of the generated recognition data and determining whether collaboration with one or more external recognition apparatus is desired based on the calculated reliability, and in response to a determination that the collaboration is desired, requesting collaboration data from the one or more external recognition apparatuses and correcting the generated recognition data based on the respective collaboration data received from the one or more external recognition apparatuses to generate final recognition data.

In response to the determination that collaboration may be desired, the method may include scanning the one or more external recognition apparatuses located within a specific range based on location information included in the sensor data, and the requesting may include requesting the respective collaboration data from the one or more scanned external recognition apparatuses.

Upon receipt of the respective collaboration data, the method may include generating the final recognition data by determining collaboration data relating to an identical recognition target among the received respective collaboration data based on one or more of a location of the one or more external recognition apparatuses, a receiving time of the respective collaboration data, a type, a size of the received collaboration data, and a keyword extracted from the received respective collaboration data, and correcting the generated recognition data by using the determined collaboration data.

In response to receipt of respective collaboration data, the method may include generating the final recognition data by selecting data having the highest reliability among the recognition data and the respective collaboration data, or by selecting data having the highest value based on at least one of a number of identical data, a percentage of identical data, and a weighted sum of reliabilities that may be obtained by applying a weighted value to the reliabilities.

Other features and aspects will be apparent from the following detailed description, the drawings, and the claims.

Figure 1:
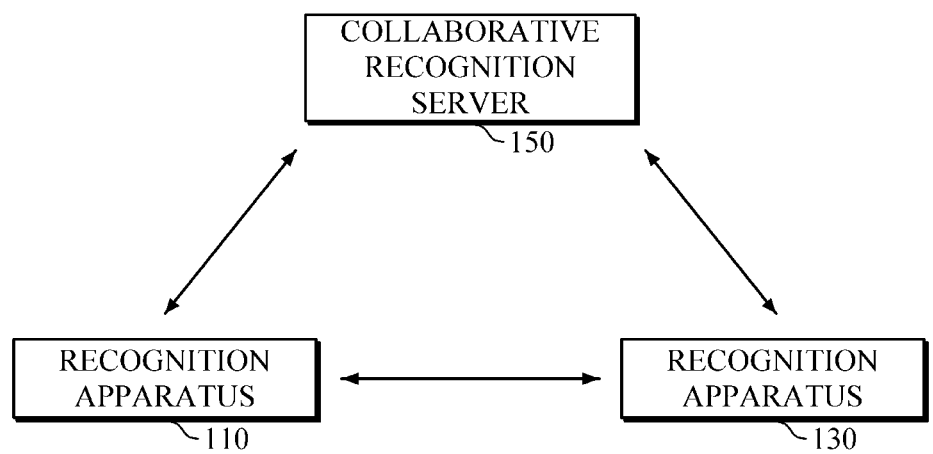
FIG. 1 is a block diagram illustrating collaborative recognition between recognition apparatuses according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

FIG. 1 is a block diagram illustrating collaborative recognition between recognition apparatuses 110 and 130 according to an embodiment. Referring to FIG. 1, the recognition apparatuses 110 and 130 share recognition data for collaborative recognition, and share the recognition data through a collaborative recognition server 150. For example, the recognition apparatus 110 and the recognition apparatus 130 share recognition data, in which the recognition apparatus 110 has a sensor or is connected to an external sensor to sense at least one or more of images, speech, location, temperature, pressure, acceleration, and orientation, for example, and generates recognition data from or by using the sensor data. The sensor data refers to information, converted into an analog signal or a digital signal, to electrically process the aforementioned speech, images, etc.

The recognition apparatus 110 generates recognition data based on sensor data received from a sensor by using a method, such as Hidden Markov Model (HMM), Dynamic Time Warping (DTW), or Neural Networks. The recognition data may be at least one of a specific keyword, text, and figure according to a recognition target or purpose. However, the recognition apparatus is not limited to the above recognition method, and may use any recognition methods known to one of ordinary skill in the art, and the recognition data may be all types of data that may be obtained by using data received from one or more sensors.

The recognition apparatus 110 calculates reliability of the generated recognition data. If the generated recognition data has reliability lower than a predetermined level, the recognition apparatus 110 corrects its own recognition data. To this end, the recognition apparatus 110 requests recognition data of another recognition apparatus 130. Based on its own recognition data and recognition data received from the other recognition apparatus 130, the recognition apparatus 110 corrects its own recognition data, and generates final recognition data or verifies its own recognition data. In this manner, the recognition apparatus 110 complements recognition data having a low reliability with the recognition data of the other recognition apparatus 130.

Recognition data received from the other recognition apparatus 130 may be defined as collaboration data. For example, the collaboration data may be the same type of data as the recognition data of the recognition apparatus 110. In another example, the collaboration data may be data that includes at least one of location, type, e.g., from a microphone or camera, and/or size of the recognition apparatus 130. The recognition data generated by the recognition apparatus 130 may be recognition data regarding the same recognition target as a recognition target of the recognition apparatus 110.

In yet another example, the recognition apparatus 110 and the other recognition apparatus 130 may share recognition data through a collaborative recognition server 150. For example, the recognition apparatus 100 generates recognition data by receiving sensor data from an internal or external sensor. In the case where it determined to correct the generated recognition data, the recognition apparatus 100 requests collaboration data from the collaborative recognition server 150. Then, by using the collaboration data received from the collaborative recognition server 150, the recognition data generated by the recognition apparatus 110 may be corrected.

The collaborative recognition server 150 may receive recognition data from the recognition apparatuses 110 and 130, and may generate collaboration data by classifying the received recognition data according to at least one criterion among purpose, location, recognition time, recognition detail, and recognition target. Upon receiving a request for collaboration data from either of the recognition apparatuses 110 and 130, the collaborative recognition server 150 selects, based on the request, collaboration data to be provided to the recognition apparatuses 110 or 130 from among the classified collaboration data, and transmits the selected collaboration data to the recognition apparatuses 110 and 130.

Figure 2:
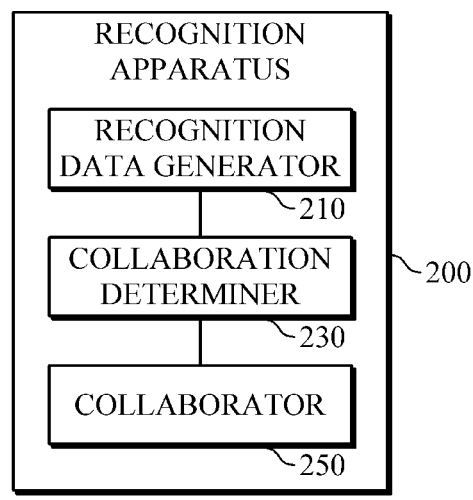
FIG. 2 is a block diagram illustrating a collaborative recognition apparatus according to an embodiment.

FIG. 2 is a block diagram illustrating a recognition apparatus 200 according to an embodiment. Referring to FIG. 2, the recognition apparatus 200 includes a recognition data generator 210, a collaboration determiner 230, and a collaborator 250.

The recognition data generator 210 generates recognition data based on sensor data. In an embodiment, in the case where the sensor data is speech data, the recognition data generator 210 may generate text data, corresponding to the speech data, as recognition data. For example, once a speaker says "Hello", a sensor receives a speech signal from the speaker and generates sensor data. The recognition data generator 210 receives the generated sensor data and generates recognition data, e.g., "hello" in a text format.

In another example, in a case where the sensor data is image data, the recognition data generator 210 may generate a keyword, corresponding to the image data, as recognition data. For example, in a case where the sensor data is an image signal of a traffic light captured by cameras, the recognition data generator 210 generates recognition data with keywords, indicating types or meanings, such as "a traffic light" or "green", of a recognition target.

The recognition data generator 210 may generate recognition data by using a method, such as Hidden Markov Model (HMM), Dynamic Time Warping (DTW), and Neural Networks. Further, in addition to the recognition methods, the recognition data generator 210 may use any other recognition methods that may be known to one of ordinary skill in the art.

In an embodiment, the recognition data generator 210 may be located external to the recognition apparatus 200. That is, the recognition data generator 210 may be located at a random position in relation to the recognition apparatus 200. For example, the recognition data generator 210 may be, or be included in, a sensor, and may generate recognition data based on data provided by the sensor. In this example, the recognition data generator 210 provides the generated recognition data to the recognition apparatus 200. In another example, the recognition data generator 210 may be interposed between a sensor and the recognition apparatus 200. In this example, the recognition data generator 210 receives sensor data from the sensor and generates recognition data, and then provides the generated recognition data to the recognition apparatus 200.

The collaboration determiner 230 determines whether the generated recognition data requires collaboration. For example, in a case where recognition data is not generated, or results of the generated recognition data is not reliable, the collaboration determiner 230 determines that collaboration is desired.

In one embodiment, the collaboration determiner 230 calculates reliability of recognition data, and determines whether collaboration is desired based on the calculated reliability. For example, the collaboration determiner 230 may calculate reliability of recognition data by using at least one of a similarity model, which is generated based on similarities between training data and recognition data, and an environment model generated based on at least one of ambient noise around sensors and a location relationship between a recognition target and sensors.

For example, in a case where speech recognition is performed using a similarity model, the recognition apparatus 200 may be a speech recognition apparatus that may recognize a geographical name spoken by a user for a vehicle navigation service, and training data may be geographical names of a country, such as names of provinces, states, cities, towns, or other regions. In this case, the recognition data generator 210 may compare the generated recognition data with training data, and if a geographic name in the generated recognition data is the same as the one in the training data, the recognition data generator 210 calculates reliability to be '1', for example. If a geographic name in the generated recognition data is not the same as the one in the training data, the recognition data generator 210 may calculate reliability according to a degree of similarity between a language model for speech recognition and the recognition data.

In another example, in the case where speech recognition is performed by using an environment model, the collaboration determiner 230 may calculate a signal-to-noise ratio (SNR) of a surrounding voice or ambient noise when a user speaks, so as to calculate reliability based on the SNR value. For example, in response to a high SNR, the collaboration determiner 230 may determine that reliability is high, and in response to a low SNR, the collaboration determiner 230 determines that reliability is low.

In another example, the collaboration determiner 230 may generate reliability based on a distance between a speaker and a sensor. For example, in the case of a short distance between a speaker and a sensor, the collaboration determiner 230 may determine that reliability is high, and in the case of a long distance between a speaker and a sensor, the collaboration determiner 230 may determine that reliability is low. A determiner or threshold of whether a distance is long may be predetermined.

In another example, reliability may be calculated based on a weighted sum obtained by applying a predetermined weighted value to the similarity model, the environment model, and a distance between a speaker and sensors.

In another example, in a case where a similarity model is used for image recognition, the recognition apparatus 200 may be an apparatus for recognizing geographical names of traffic signs on roads, and the collaboration determiner 230 may compare recognition data generated by the recognition data generator 210 with geographical names. In a case where a geographical name is the same as the one in the generated recognition data, the collaboration determiner 230 calculates reliability to be '1', for example. In a case where a geographical name is not the same as the one in the generated recognition data, the collaboration determiner 230 may calculate reliability according to a degree of similarity of a language model for speech recognition and recognition data.

In another example, the collaboration determiner 230 may calculate reliability based on the quality of an image signal. For example, the collaboration determiner 230 may calculate reliability based on at least one of determined resolution, density, contrast, definition, color sensitivity, and noise magnitude of an image signal. For example, in a case of calculating reliability by using an image resolution, the collaboration determiner 230 may determine that reliability is high if a resolution of an image obtained from a sensor is high, and the collaboration determiner 230 determines that reliability is low if resolution is low. A determiner or threshold for whether a resolution being high or low may be predetermined.

In another example, the collaboration determiner 230 may generate reliability based on a distance between an object and a sensor. For example, in a case of a short distance between an object and a sensor, the collaboration determiner 230 determines that reliability is high, and in a case of a long distance between an object and a sensor, the collaboration determiner 230 determines that reliability is low. A determiner or threshold of whether a distance is long may be predetermined.

In another example, the collaboration determiner 230 may determine reliability based on a weighted sum obtained by applying a predetermined weighted value to the similarity model, the environment model, and a distance between a speaker and sensors. Based on the calculated reliability as described above, the collaboration determiner 230 determines whether the recognition apparatus 200 requires or desires collaboration. To this end, the collaboration determiner 230 determines that collaboration is not desired in a case where the calculated reliability is greater than or meets a predetermined threshold, and determines that collaboration is desired in a case where the calculated reliability does not meet a predetermined threshold. Otherwise, if the determiner determines that collaboration is not desired, the recognition data may be deleted or indicated to a user, for example, as being unreliable.

In response to a determination by the collaboration determiner 230 that collaboration is desired, the collaborator 250 requests collaboration data from an external recognition apparatus, and corrects the recognition data based on the collaboration data received from the external recognition apparatus, and generates final recognition data.

In an embodiment, the recognition apparatus 200 may further include sensors and a communicator. The sensors may be any one or any combination of one or more of an image sensor, a voice sensor, a location sensor, a gyroscope, a temperature sensor, a pressure sensor, and an accelerometer. Further, a sensor may be mounted in the recognition apparatus 200, or may be connected to an exterior frame of the recognition apparatus 200 and external to the recognition apparatus 200. For example, in a case where a sensor is a microphone, the sensor generates sensor data by receiving an audio signal and converting the signal into an electric signal and storing the audio data. In another example, in a case where the sensor is a camera, the sensor generates sensor data by receiving an image signal and converting the signal into an electric single and storing the image data.

The communicator is used to request collaboration data from an external recognition apparatus, or to receive collaboration data from an external recognition apparatus. The communicator may include components, such as a modem or an antenna for communicating with an external recognition apparatus. Further, the communicator may use any communication method including LAN, Wi-Fi, Bluetooth, Infrared Data Association (IrDA), HomeRF, Near-Field Communication (NFC), Ultra Wide Band (UWB), and ZigBee. The communication method used by the communicator is not limited thereto, and the communicator may also use other communication methods for communication between devices as long as the methods may be easily performed by one of ordinary skill in the art.

Figure 3:
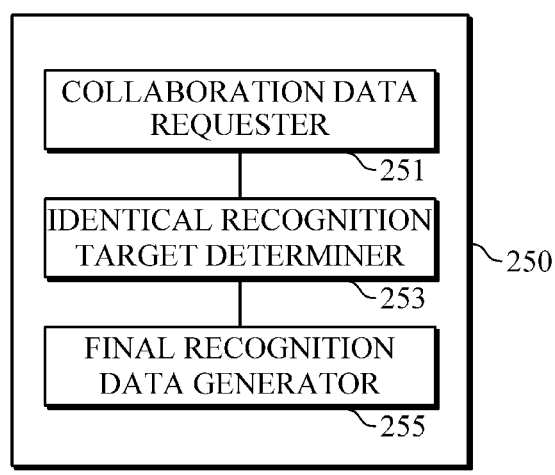
FIG. 3 is a block diagram illustrating a collaborator according to an embodiment.

FIG. 3 is a block diagram illustrating a collaborator 250 according to an embodiment. Referring to FIG. 3, the collaborator 250 includes a collaboration data requester 251, an identical recognition target determiner 253, and a final recognition data generator 255.

In response to a determination to collaborate by the collaboration determiner 230, the collaboration data requester 251 scans for an external recognition apparatus to provide collaboration data, requests the collaboration data from the found recognition apparatus, receives collaboration data from the scanned external recognition apparatus, and corrects recognition data based on the received collaboration data, so as to generate final recognition data. In this case, there may be one or more external recognition apparatuses that request and/or provide collaboration data.

In response to a determination by the collaboration determiner 230 for collaboration data is desired, the collaboration data requester 251 may scan external recognition apparatuses that are located within a specific predetermined range, e.g., based on location information, and selects an external recognition apparatus among the scanned external recognition apparatuses.

For example, the collaboration data requester 251 may identify a current location of the recognition apparatus 200 by using location information, such as a GPS controller of the collaborator, and scan external recognition apparatuses by receiving similar location information from another external recognition apparatuses which are located within a specific range, and selects an external recognition apparatus to which a collaboration data request is to be transmitted.

In another example, the collaboration data requester 251 may receive signals generated from external recognition apparatuses, and identifies external recognition apparatuses that have signals greater than a specific predetermined level as recognition apparatuses located nearby. For example, in a case where the recognition apparatus 200 communicates with an external recognition apparatus by using a Bluetooth protocol, the collaboration data requester 251 selects an external recognition apparatus having a signal greater than a specific level as a recognition apparatus located nearby.

In another example, the collaboration data requester 251 may identify external recognition apparatuses, which are connected with the collaboration data requester 251 through a specific network, as nearby recognition apparatuses. For example, in a case where the recognition apparatus 200 is connected to an external recognition apparatus through a network in a specific space or with a specific purpose, such as a local area network, a home network, an office network in a conference room, a building network, or a vehicle network, the collaboration data requester 251 identifies the external recognition apparatuses as being recognition apparatuses located within the specific range. Upon determination that collaboration data is desired, the collaboration data requester 251 scans for one or more external recognition apparatuses to identify recognition apparatuses that perform an identical, or substantially identical, purpose. In this case, the collaborator 250 receives purpose identification information that includes one or more of the following: apparatus information from the found external recognition apparatuses, location information, communication method information, and data format information of one or more external apparatuses. Then, the collaborator 250 compares the received purpose identification information with purpose identification information of the recognition apparatus 200 to determine which of the purposes match, e.g., are identical or substantially identical.

For example, the collaboration data requester 251 may determine whether purposes are identical based on received apparatus information from one or more external apparatuses. For example, in a case where the recognition apparatus 200 is a meeting recorder, the collaboration data requester 251 receives apparatus information of external recognition apparatuses and may scan for and identify a recognition apparatus that records a meeting. Here, the external recognition apparatuses may include, or be, one or more microphones or cameras or both. Further, the collaboration data requester 251 may determine whether purposes are substantially identical by receiving apparatus information that includes at least one of a model number, a serial number, a modem number, and a manufacturer.

In another example, the collaboration data requester 251 may determine whether purposes are identical, or substantially identical, by receiving communication method information. For example, in a case where the recognition apparatus 200 communicates with an external recognition apparatus by using a signal of a specific frequency, the collaboration data requester 251 scans for and then identifies an external recognition apparatus, that uses a signal of an identical frequency, as a recognition apparatus with an identical purpose.

In another example, the collaboration data requester 251 determines whether purposes are identical, or substantially identical, by receiving data format information. For example, in a case where the recognition apparatus 200 uses data of a specific format, size, or extension, the collaboration data requester 251 scans for and identifies an external recognition apparatus, that uses an identical data format as a recognition apparatus with an identical, or substantially identical purpose.

Then, the collaboration data requester 251 requests collaboration data from one or more found external recognition apparatuses, in which the collaboration data includes respective recognition data generated by external recognition apparatuses. Further, the collaboration data includes reliability of respective recognition data and sensor data.

Upon receiving collaboration data from one or more external recognition apparatuses, the identical recognition target determiner 253 determines which of the received collaboration data corresponds to an identical recognition target based on one or more of the following: locations of one or more external recognition apparatuses; receiving time, types, and sizes of collaboration data; and keywords extracted from the collaboration data. The identical recognition target may be, for example, an identical speaker for speech recognition, and an identical object for image recognition.

For example, in a case where the recognition apparatus 200 is a recognition apparatus of traffic signs, the identical recognition target determiner 253 may determine, based on a location of the recognition apparatus 200, collaboration data of external recognition apparatuses located within a specific range as collaboration data regarding an identical recognition target. For example, in a case where the recognition apparatus 200 and an external recognition apparatus are determined to be located at the same intersection, the identical recognition target determiner 253 determines that the external recognition apparatus generated collaboration data regarding the recognition target identical to a recognition target of the recognition apparatus 200.

In another example, in a case where the recognition apparatus 200 is a speech recognition apparatus, the identical recognition target determiner 253 may determine whether collaboration data and recognition data are related to an identical recognition target based on keywords extracted from the collaboration data. For example, in a case where more than a specific number or a specific percentage of keywords extracted from collaboration data are identical to keywords of recognition data generated by the recognition data generator 210, the identical recognition target determiner 253 determines that the collaboration data and the recognition data are related to an identical recognition target. The specific number or percentage may be predetermined.

In response to a determination that the collaboration data and the recognition data are predetermined to be related to an identical recognition target, the final recognition data generator 255 may correct the recognition data by using collaboration data from the received collaboration data, that is determined to be collaboration data regarding an identical recognition target.

For example, the final recognition data generator 255 may generate final recognition data by selecting data having the highest reliability from among data including recognition data and collaboration data, or by selecting data having the highest value based on at least one of the following: a number of identical data, a percentage of identical data; and a weighted sum of reliabilities that is obtained by applying a weighted value to the reliabilities. For example, in the case where the final recognition data generator 255 receives collaboration data from two external recognition apparatuses, the result may be shown in Table 1 below.

TABLE 1

| Type | Recognition data | First collaboration data | Second collaboration data |
|---|---|---|---|
| Data | Monday | Monday | Tuesday |
| Reliability | 0.7 | 0.8 | 0.9 |

Referring to Table 1, in the case where the final recognition data generator 255 selects data having the highest reliability from among data including recognition data and collaboration data, the final recognition data generator 255 selects second collaboration data having the highest reliability of 0.9 in Table 1, and generates the final recognition data of "Tuesday".

In the case of using the number of identical data, the number of data equally indicating "Monday" is two, with one datum indicating "Tuesday", the final recognition data generator 255 selects "Monday" as final recognition data. Similarly, in the case of using the percentage of identical data, the percentage of "Monday" is ⅔, and the percentage of "Tuesday" is ⅓, such that the final recognition data generator 255 selects "Monday" as final recognition data. In yet another example, in the case where the final recognition data generator 255 selects final recognition data based on a weighted sum of reliabilities that is obtained by applying a weighted value to the reliabilities, a weighted sum of "Monday" is 1.5, and a weighted sum of "Tuesday" is 0.9, such that the final recognition data generator 255 selects "Monday" as final recognition data.

Figure 4:
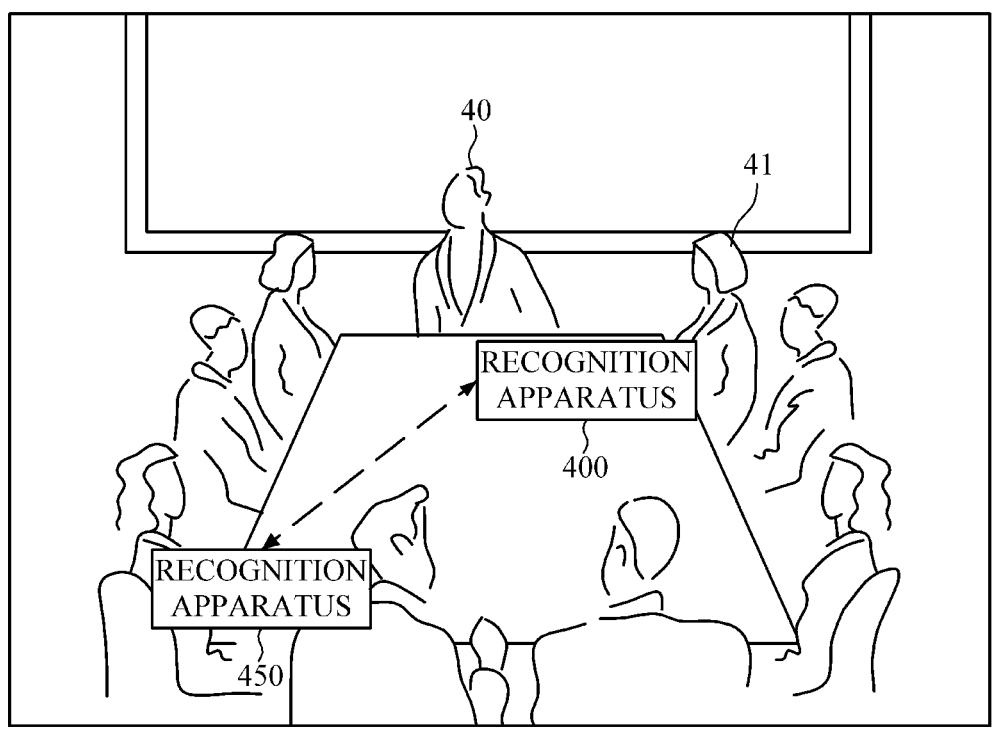
FIG. 4 is a diagram illustrating collaboration between speech recognition apparatuses according to an embodiment.

FIG. 4 is a diagram illustrating collaboration between speech recognition apparatuses 400 and 450 according to an embodiment.

Referring to FIG. 4, the speech recognition apparatus 400 and the speech recognition apparatus 450 may share collaboration data. For example, the two speech recognition apparatuses 400 and 450 are physically separated from each other, which may result in a difference of audio signal magnitudes. Further, if a nearby speaker 41 speaks, an audio signal of the speaker 41 may lead to wrong recognition. For example, in a case where the speaker 40 speaks, the speech recognition apparatus 400 may recognize speech of the speaker 40 as "let's meet on Monday", while the speech recognition apparatus 450 may recognize the speech as "let's meet on Sunday".

In this case where there is a discrepancy between the two recognition apparatuses, the speech recognition apparatus 450 calculates reliability of its own recognition data, and in response to the reliability being lower than a predetermined reliability, the speech recognition apparatus 450 requests collaboration data from the speech recognition apparatus 400. The speech recognition apparatus 450 receives collaboration data from the speech recognition apparatus 400, and selects data having the highest reliability, from the recognition data and the collaboration data to generate a final recognition data. For example, in the case where a reliability of recognition data of the speech recognition apparatus 450 is 0.6, and a reliability of collaboration data of the speech recognition apparatus 400 is 0.9, the speech recognition apparatus 450 generates the collaboration data of the speech recognition apparatus 400, "let's meet on Monday" (collaboration data), as final recognition data.

Figure 5:
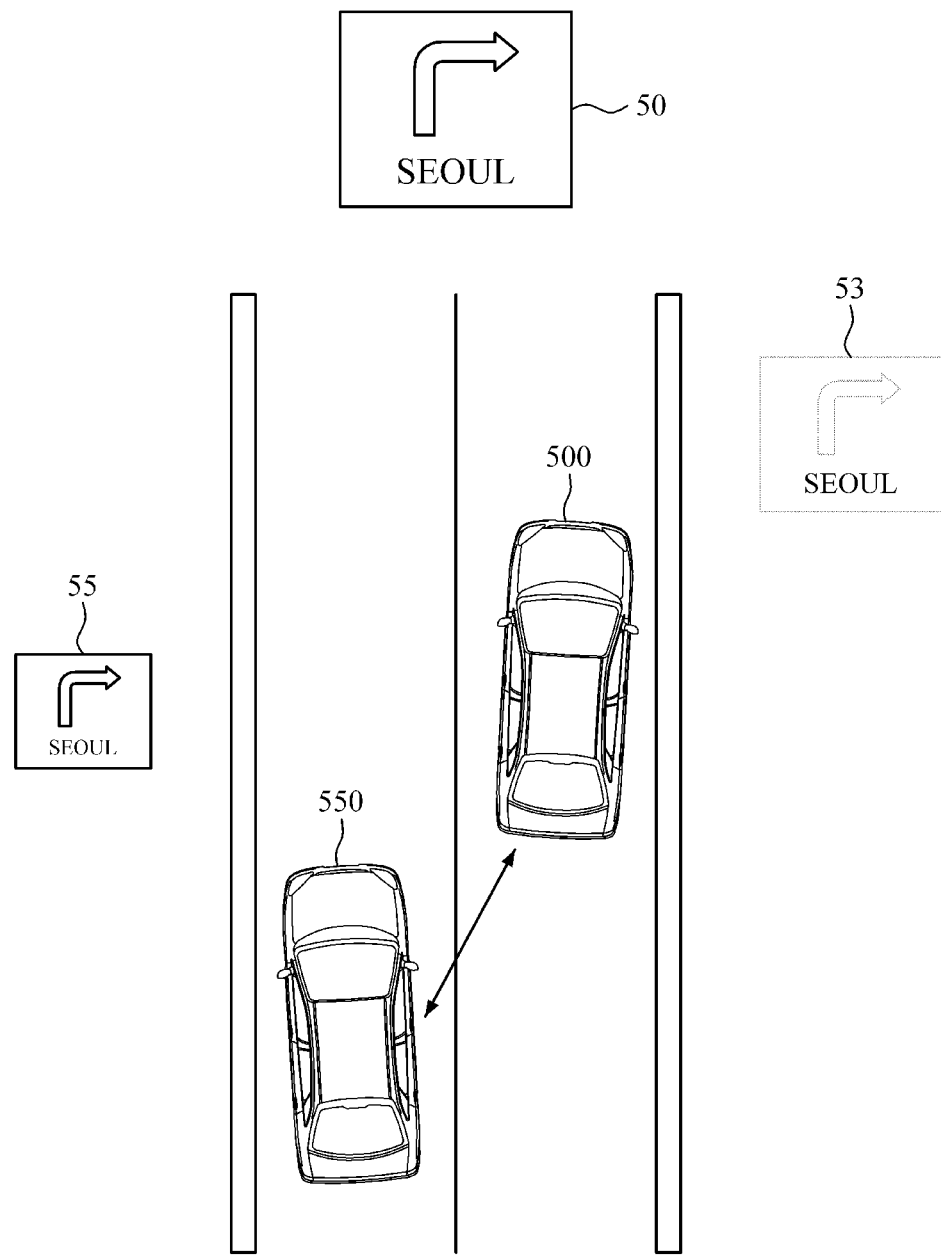
FIG. 5 is a diagram illustrating collaboration between image recognition apparatuses according to an embodiment.

FIG. 5 is a diagram illustrating collaboration between image recognition apparatuses 500 and 550 according to an embodiment. Referring to FIG. 5, the image recognition apparatuses 500 and 550 may be included in a vehicle, and may recognition a sign 50 necessary for vehicle driving.

For example, in a case where the image recognition apparatuses 500 and 550 recognize an identical sign, the image recognition apparatus 550 recognizes the sign 50 at a closer location than the image recognition apparatus 550, such that an image 53 recognized by the image recognition apparatus 500 is bigger than an image 55 recognized by the image recognition apparatus 550. For this reason, the image recognition apparatus 550, which recognizes the sign 50 at a distance, may obtain recognition data having reliability below a predetermined level, and may request collaboration data from the image recognition apparatus 500.

In a case where there is backlight around the image recognition apparatus 500 that recognizes a sign, a blurred image 53 may be obtained. In this case, the image recognition apparatus 500 generates recognition data having reliability below a predetermined level, and requests collaboration data from the image recognition apparatus 550.

For example, if data generated by the image recognition apparatus 500 indicates "Seoul, drive straight", and has reliability of 0.5, while data generated by the image recognition apparatus 550 indicates "Seoul, turn to the right", and has reliability of 0.8, the image recognition apparatuses 500 and 550 collaborate and generate "Seoul, turn to the right" as final recognition data based on the reliabilities.

Figure 6:
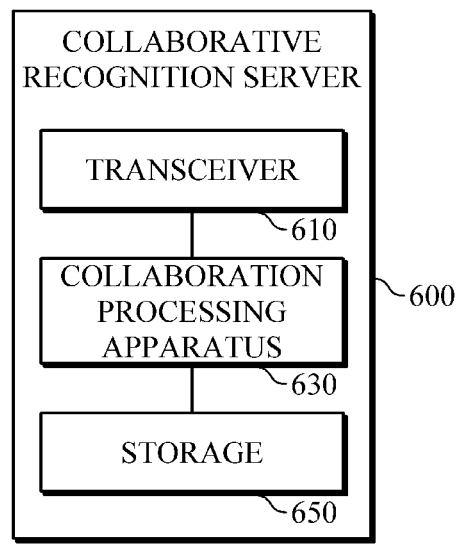
FIG. 6 is a block diagram illustrating a collaborative recognition server according to an embodiment.

FIG. 6 is a block diagram illustrating a collaborative recognition server according to an embodiment. Referring to FIG. 6, the collaborative recognition server 600 includes a transceiver 610, a collaboration processing apparatus 630, and a storage 650. The collaborative recognition server 600 may be an example of the collaborative recognition server 150 of FIG. 1. The collaborative recognition server may also be a recognition apparatus, such as illustrated FIG. 2, and operate similarly for locally sensed data. In addition, having both the collaboration recognition server 600 of FIG. 6 and the recognition apparatus 200 of FIG. 2 may be considered collaborative recognition apparatuses. The collaborative recognition server 600 may be connected with one or more recognition apparatuses through a wired or wireless network, and may collect recognition data generated by each connected recognition apparatus. Further, the collaborative recognition server 600 classifies the collected recognition data according to predetermined criteria, generates and stores collaboration data based on each of the classified recognition data, and in response to receiving a signal to request collaboration data from a recognition apparatus that desires collaboration data, provides collaboration data to the requesting recognition apparatus.

The transceiver 610 may perform data communication with a recognition apparatus. For example, the transceiver 610 may receive recognition data from a recognition apparatus, and may receive a signal to request collaboration data. Further, the transceiver 610 may be connected with the collaboration processing apparatus 630, and may include a modem, an antenna, and the like for communication with a recognition apparatus. For example, the transceiver 610 may use any one or more communication methods among LAN, Wi-Fi, Bluetooth, Infrared Data Association (IrDA), HomeRF, Near-Field Communication (NFC), Ultra Wide Band (UWB), and ZigBee. The communication method used by the transceiver 610 is not limited thereto, and the transceiver 610 may also use other communication methods for communication between devices.

The collaboration processing apparatus 630 collects recognition data, received from the transceiver 610 of the recognition apparatus and generates collaboration data by using the collected recognition data. Further, the collaboration processing apparatus 630 provides the generated collaboration data in response to a request from the recognition apparatus.

For example, the collaboration processing apparatus 630 may classify the collected recognition data according to at least one of a recognition purpose and a recognition target. Further, the collaboration processing apparatus 630 may store the classified recognition data in the storage 650, and may generate collaboration data by using the recognition data. The collaboration processing apparatus 630 will be described in detail below with reference to FIG. 7.

The storage 650 may be a memory and may include at least one of the following: recognition data received from the transceiver 610; recognition data classified by the collaboration processing apparatus 630; and collaboration data generated by the collaboration processing apparatus 630.

In an embodiment, the memory may include at least one of RAM, ROM, flash memory, hard disk, magnetic tape, and optical disk drive (ODD), as only examples.

Figure 7:
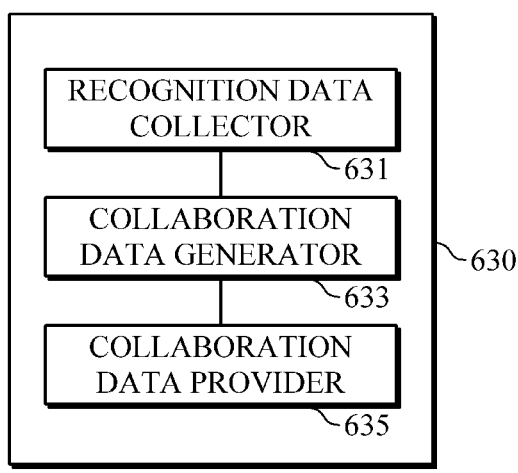
FIG. 7 is a block diagram illustrating a collaboration recognition apparatus according to an embodiment.

FIG. 7 is a block diagram illustrating a collaboration processing apparatus 630 according to an embodiment. Referring to FIG. 7, the collaboration processing apparatus 630 includes a recognition data collector 631, a collaboration data generator 633, and a collaboration data provider 635. The collaboration processing apparatus 630 may be an embodiment of the collaboration processing apparatus 630 illustrated in FIG. 6, though embodiments are not limited thereto.

The recognition data collector 631 collects recognition data from one or more recognition apparatuses. For example, the recognition data collector 630 may receive and collect recognition data generated by recognition apparatuses, which are connected with the recognition data collector 630 through a wired or wireless network.

Further, the recognition data collector 631 may classify recognition data, collected from one or more recognition apparatuses, according to at least one of a recognition purpose or a recognition target, and may store a classification result in a recognition database (DB). For example, the recognition purpose may be at least one or more of image recognition, speech recognition, location recognition, position recognition, temperature recognition, pressure recognition, and acceleration recognition. Further, the recognition target may be a subject of image recognition, voice of a speaker, or an object of which location, position, temperature, pressure, and acceleration are to be measured. For example, the recognition data database (DB) may be an embodiment of the storage illustrated in FIG. 6, and may include at least one or more of RAM, ROM, flash memory, hard disk, magnetic tape, and optical disk drive (ODD), as only examples.

Upon collecting recognition data from one or more recognition apparatuses, the collaboration data generator 633 may generate collaboration data by classifying the collected recognition data according to predetermined criteria. The predetermined criteria may include at least one of a purpose, a location, a recognition time, a recognition detail, and a recognition target, for example.

Upon collecting the recognition data, the collaboration data generator 633 calculates reliability of the collected recognition data, and generates collaboration data based on the calculated reliability.

For example, the collaboration data generator 633 calculates reliability based on a similarity between training data, which corresponds to a purpose of a recognition apparatus or to recognition data, and recognition data received from the recognition apparatus. In another example, the collaboration data generator 633 may receive information on the surroundings of the recognition apparatus, as described above, and may calculate reliability based on the received information. In yet another example, when receiving recognition data from the recognition apparatus, the collaboration data generator 633 may receive reliability of the received recognition data, and may calculate reliability based on the received reliability.

Based on the calculated reliability, the collaboration data generator 633 may generate collaboration data by selecting recognition data, having the highest reliability, from among the collected recognition data, or by selecting recognition data, having the highest value, from among each recognition data based on at least one of a number of identical recognition data, a percentage of identical recognition data, and a weighted sum of reliabilities that is obtained by applying a weighted value to the reliabilities.

For example, in the case where the collaboration data generator 633 receives recognition data from three recognition apparatuses, in which contents and reliabilities of each recognition data are "Monday, 0.7", "Monday, 0.8", and "Tuesday, 0.9" respectively, the collaboration data generator 633 selects "Tuesday", which has the highest reliability among the recognition data, as collaboration data, for example only. Further, in the case where the collaboration data generator 633 generates collaboration data based on the number or percentage of identical recognition data, the collaboration data generator 633 selects "Monday" as the collaboration data, for example only. In the case where the collaboration data generator 633 selects collaboration data based on a weighted sum of reliabilities that is obtained by applying a weighted value to the reliabilities, the collaboration data generator 633 selects "Monday" as the collaboration data, since a weighted sum of "Monday" is 1.5, which is greater than a weighted sum of "Tuesday" which is 0.9, for example only.

In response to receiving a request for collaboration data from any one recognition apparatus, the collaboration data provider 635 determines, based on the request, collaboration data to be provided to the requesting recognition apparatus by selecting the data from among the generated collaboration data, and may transmit the determined collaboration data to a recognition apparatus that has requested the data.

The request may include at least one of the following: location information of a recognition apparatus, and types, sizes, and reliabilities of recognition data, for example.

For example, in a case where the collaboration data provider 635 receives location information of a recognition apparatus, the collaboration data provider 635 determines collaboration data generated by using recognition data of recognition apparatuses located within a specific predetermined range so as to provide the data to a recognition apparatus that has requested the collaboration data. In another example, in the case where the collaboration data provider 635 receives information on the types of recognition data, the collaboration data provider 635 selects an identical or substantially identical type of recognition data from the generated collaboration data and determines the recognition data as collaboration data to be provided to a recognition apparatus that has requested the collaboration data.

Upon receiving a request for collaboration data from a recognition apparatus, the collaboration data provider 635 may determine whether collaboration is desired based on reliability of generated collaboration data, and may determine collaboration data to be provided to the recognition apparatus in response to the determination that collaboration is desired. For example, in a case where reliability of the generated collaboration data is below a predetermined level, the collaboration data provider 635 determines that collaboration is not desirable, and does not provide collaboration data to the requesting recognition apparatus.

In another example, upon receiving a request for collaboration data from a recognition apparatus, the collaboration data provider 635 may compare the generated collaboration data with recognition data of the recognition apparatus that has requested the collaboration data, and may determine that collaboration is not desirable in response to a comparison showing that the two data are different, and thus, may not provide collaboration data to the requesting recognition apparatus. Additionally, if the collaboration data provider 635 determines that collaboration data is desirable in response to a showing that the two data are different, the collaborative data provider 635 may provide the collaboration data to the requesting recognition apparatus if the reliability of the collaboration data is greater than the reliability of the recognition data.

Figure 8:
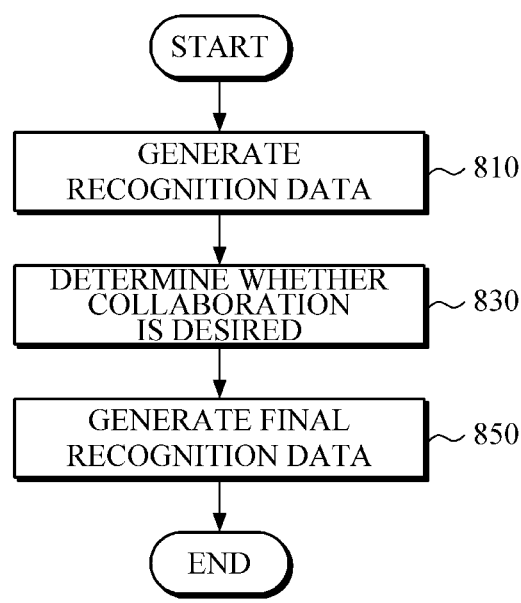
FIG. 8 is a flowchart illustrating a collaboration recognition method.

FIG. 8 is a flowchart illustrating a collaboration processing method. A recognition apparatus receives sensor data from one or more sensors, which are mounted in/on the recognition apparatus, or which are connected to the recognition apparatus. The sensors may be at least one or more of an image sensor, a camera, a voice sensor, a location sensor, GPS sensor, a gyroscope, a microphone, a temperature sensor, a pressure sensor, and an accelerometer, as only examples.

Upon receiving the sensor data from sensors, a recognition apparatus generates recognition data based on the received sensor data in operation 810. For example, in the case where the sensor data is speech data, the recognition apparatus generates text data, corresponding to the speech data, as recognition data. For example, once a speaker says "Hello", a sensor receives a speech signal from the speaker and generates sensor data. The recognition apparatus then receives the generated sensor data, and generates recognition data "Hello" in a text format.

In another example, in the case where the sensor data is image data, the recognition apparatus generates a keyword, corresponding to the image data, as recognition data. For example, in the case where the sensor data is an image signal of a traffic light captured by cameras, the recognition apparatus generates recognition data with keywords, indicating types or meanings, such as "a traffic light" or "green", of a recognition target.

In operation 830, the recognition apparatus determines whether collaboration is desired for the generated recognition data. For example, in the case where recognition data is not generated, or a result of recognition data is not reliable, the recognition apparatus determines that collaboration is desired for the recognition data. To this end, the recognition apparatus calculates reliability of recognition data by using at least one of the following: a similarity model generated based on a similarity between training data and recognition data that are used for generating recognition data; and an environment model generated based on at least one of an ambient noise around sensors and a location relationship between a recognition target and sensors. Based on the calculated reliability, the recognition apparatus determines whether collaboration is desired.

In response to a determination by the recognition apparatus that collaboration is desired, the recognition apparatus requests collaboration data from one or more external recognition apparatuses, and corrects recognition data based on the received collaboration data to generate final recognition data in operation 830.

In this case, in order to request collaboration data from one or more external recognition apparatuses, the recognition apparatus uses location information, included in the sensor data received from sensors, to determine which one or more external recognition apparatuses are located within a specific range from the current location of the recognition target to scan for the requested collaboration data. Upon identifying one or more external recognition apparatuses within the specific range, the recognition apparatus requests collaboration data from the one more identified external recognition apparatuses.

Upon receiving collaboration data from the one or more external recognition apparatuses, the recognition apparatus determines collaboration data regarding an identical recognition target from among the received collaboration data, based on one or more of the following: locations of one or more external recognition apparatuses; receiving time, types, and sizes of collaboration data; and keywords extracted from collaboration data.

For example, in the case where the recognition apparatus is a recognition apparatus for recognizing traffic signs, the recognition apparatus may determine collaboration data of external recognition apparatuses, located within a specific range, to be collaboration data regarding an identical recognition target. In another example, in the case where the recognition apparatus is a recognition apparatus for speech recognition, the recognition apparatus may determine whether collaboration data is related to an identical recognition target based on keywords extracted from collaboration data.

Once the recognition apparatus determines which collaboration data is related to an identical recognition target, the recognition apparatus corrects recognition data by using the determined collaboration data. In this case, the recognition apparatus corrects recognition data by selecting data having the highest reliability among data that includes recognition data and determined collaboration data, or by selecting data having the greatest value among at least one of a number of identical data, a percentage of identical data, and a weighted sum of reliabilities that is obtained by applying a weighted value to the reliabilities.

The collaborative recognition server 150, recognition apparatuses 110, 130, and 200, recognition data generator 210, collaboration determiner 230, collaborator 250, collaboration data requester 251, identical recognition target determiner 253, final recognition data generator 255, transceiver 610, collaboration processing apparatus 630, collaboration data collector 631, collaboration data generator 633, collaboration data provider 635, and an automobile, in FIG. 1-7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a recognition apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A collaborative recognition apparatus, the recognition apparatus comprising:
    a recognition data generator configured to generate recognition data relating to a recognition target, based on sensor data of one or more sensors;
    a processor configured to:
        calculate a reliability of the recognition data;
        determine whether a collaboration is desired based on the calculated reliability;
        in response to a determination that the collaboration is desired, scan for an external recognition apparatus and receive initial data from the external recognition apparatus;
        request collaboration data from the external recognition apparatus in response to the initial data indicating that the external recognition apparatus is located nearby the collaborative recognition apparatus or that a function of the external recognition apparatus is similar or identical to a function of the one or more sensors;
        receive the collaboration data from the external recognition apparatus; and
        generate final recognition data by correcting the recognition data based on the received collaboration data in response to the received collaboration data relating to the recognition target.

2. The apparatus of claim 1, wherein the processor comprises:
    a collaboration determiner configured to
        calculate the reliability of the recognition data, and
        determine whether the collaboration is desired based on the calculated reliability; and
    a collaborator configured to, in response to a determination that the collaboration is desired:
        request the collaboration data from the external recognition apparatus, and
        correct the recognition data based on the collaboration data received from the external recognition apparatus to generate the final recognition data.

3. The recognition apparatus of claim 2, wherein the recognition data generator is configured to
    receive the sensor data from the one or more sensors, wherein the one or more sensors are mounted in the recognition apparatus or connected to the recognition apparatus, and
    based on the received sensor data, generate the recognition data that includes any one or any combination of any two or more of keywords, texts, and figures according to the recognition target or a recognition purpose of the recognition apparatus.

4. The apparatus of claim 3, wherein the one or more sensors include any one or any combination of any two or more of an image sensor, a voice sensor, a location sensor, a gyro sensor, a temperature sensor, a pressure sensor, and an accelerometer.

5. The apparatus of claim 2, wherein the collaboration determiner is configured to calculate the reliability of the recognition data by using either one or both of a similarity model generated based on a similarity between training data and recognition data that are used to generate the recognition data, and an environment model generated based on either one or both of an ambient noise around the one or more sensors and a location relationship between the recognition target and the one or more sensors.

6. The apparatus of claim 2, wherein the collaborator comprises a collaboration data requester configured to, in response to the determination that collaboration is desired
    scan one or more external recognition apparatuses located within a specific range based on location information included in the sensor data, and
    request the collaboration data from the one or more scanned external recognition apparatuses.

7. The apparatus of claim 6, wherein the collaboration data requester is configured to:
    receive the function identification information that includes any one or any combination of any two or more of apparatus information, location information, communication method information, and data format information of the one or more external recognition apparatuses;
    compare the received function identification information with function identification information of the recognition apparatus to scan an external recognition apparatus that serves an identical or similar function; and
    request the collaboration data from the external recognition apparatus.

8. The apparatus of claim 2, wherein the collaborator comprises an identical recognition target determiner configured to, in response to receiving the collaboration data from the external recognition apparatus:
    determine collaboration data relating to the recognition target, among the received collaboration data, based on any one or any combination of any two or more of a location of the external recognition apparatuses, a receiving time, a type, and a size of the received collaboration data, and a keyword extracted from the received collaboration data, and correct the recognition data by using the determined collaboration data.

9. The apparatus of claim 2, wherein the collaborator comprises a final recognition data generator configured to generate final recognition data by selecting data having the highest reliability from among data that includes the recognition data and the collaboration data, or by selecting data having the highest value from among the data based on any one or any combination of any two or more of a number of identical data, a percentage of identical data, and a weighted sum of reliabilities that is obtained by applying a weighted value to the reliabilities.

10. A collaboration recognition apparatus, the apparatus comprising:
a recognition data collector configured to collect recognition data from a plurality of external recognition apparatuses;
a collaboration data generator configured to generate collaboration data by classifying the collected recognition data according to criteria including either one or both of a format and a target of the recognition data; and
a collaboration data provider configured to, in response to receiving a collaboration data request from a requesting recognition apparatus:
select collaboration data from among the collaboration data corresponding to one of the external recognition apparatuses, in response to determining that the one of the external recognition apparatuses is located nearby the requesting apparatus or that a function of the one of the external recognition apparatuses is similar or identical to a function of the requesting apparatus, and
transmit the selected collaboration data to the requesting apparatus.

11. The apparatus of claim 10, further comprising a recognition data generator configured to generate recognition data from a sensor of the apparatus,
wherein the recognition data collector is further configured to collect the recognition data from the plurality of recognition apparatuses and the recognition data generator.

12. The apparatus of claim 10, wherein the recognition data collector is further configured to classify the recognition data collected from the recognition apparatuses according to either one or both of a recognition purpose and a recognition target, and store the classified recognition data in a recognition data database.

13. The apparatus of claim 10, wherein the criteria further include any one or any combination of any two or more of a purpose, a location, a recognition time, and a recognition detail of the recognition apparatuses.

14. The apparatus of claim 10, wherein the collaboration data generator is further configured to generate the collaboration data by selecting data having the highest reliability among reliabilities of the collected recognition data, from among the collected recognition data, or by determining the select recognition data having the highest value, from among the collected recognition data, based on any one or any combination of any two or more of a number of identical recognition data, a percentage of identical recognition data, and a weighted sum of reliabilities that is obtained by applying a weighted value to the reliabilities.

15. The apparatus of claim 13, wherein in response to receiving a request for the collaboration data from any one of the recognition apparatuses, the collaboration data provider is further configured to determine whether collaboration is desired based on reliabilities of the generated collaboration data, and in response to a determination that the select collaboration is desired, the collaboration data provider is further configured to determine collaboration data to be provided to the recognition apparatus among the recognition apparatuses.

16. The apparatus of claim 10, wherein the request includes any one or any combination of any two or more of locations of the recognition apparatuses, and any of types, sizes, and acceptable reliabilities of the recognition data.

17. A processor implemented collaborative recognition method, the recognition method comprising:
generating recognition data relating to a recognition target, based on sensor data of one or more sensors;
calculating a reliability of the generated recognition data;
determining whether a collaboration is desired based on the calculated reliability;
in response to a determination that the collaboration is desired, scanning for an external recognition apparatus and receiving initial data from the external recognition apparatus;
requesting collaboration data from the external recognition apparatus in response to the initial data indicating that the external recognition apparatus is located nearby the collaborative recognition apparatus or that a function of the external recognition apparatus is similar or identical to a function of the one or more sensors;
receiving the collaboration data from the external recognition apparatus; and
generating final recognition data by correcting the generated recognition data based on the received collaboration data in response to the received collaboration data relating to the recognition target.

18. The method of claim 17, wherein:
the scanning includes scanning for one or more external recognition apparatuses located within a specific range based on location information included in the sensor data, and
the requesting includes requesting respective collaboration data from the one or more scanned external recognition apparatuses.

19. The method of claim 18, further comprising:
upon receipt of the respective collaboration data, generating the final recognition data by determining collaboration data relating to the recognition target among the received respective collaboration data based on any one or any combination of any two or more of a location of the one or more external recognition apparatuses, a receiving time of the respective collaboration data, a type, a size of the received collaboration data, and a keyword extracted from the received respective collaboration data; and
correcting the generated recognition data by using the determined collaboration data.

20. The method of claim 18, further comprising, in response to receipt of the respective collaboration data, generating the final recognition data by selecting data having the highest reliability among the recognition data and the respective collaboration data, or by selecting data having the highest value based on any one or any combination of any two or more of a number of identical data, a percentage of identical data, and a weighted sum of reliabilities that is obtained by applying a weighted value to the reliabilities.

* * * * *